April 14, 1953  S. T. ROBERTS  2,634,509
SPIRIT LEVEL
Filed March 26, 1952  2 SHEETS—SHEET 1
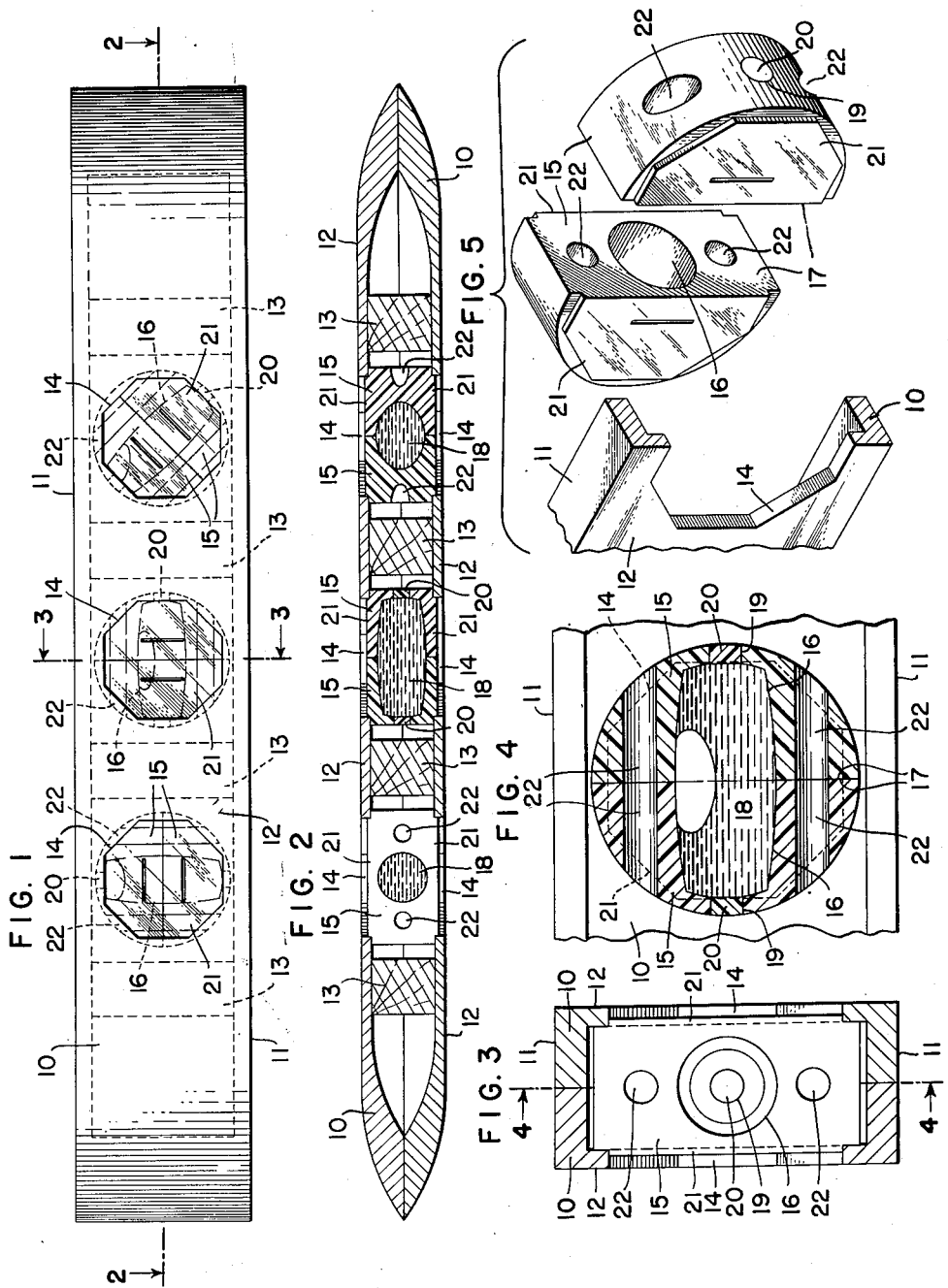
INVENTOR.
SINCLAIR T. ROBERTS
BY
Jas. C. Hobensmith
ATTORNEY.

April 14, 1953   S. T. ROBERTS   2,634,509
SPIRIT LEVEL
Filed March 26, 1952   2 SHEETS—SHEET 2
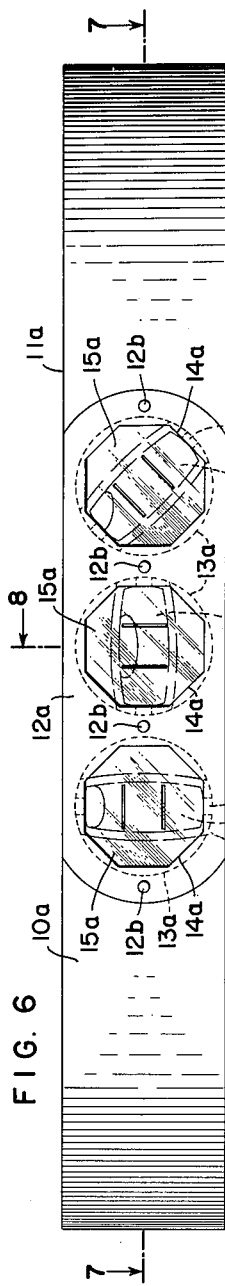
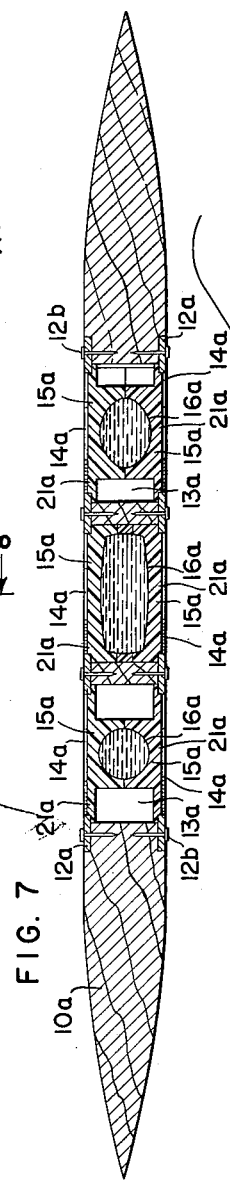
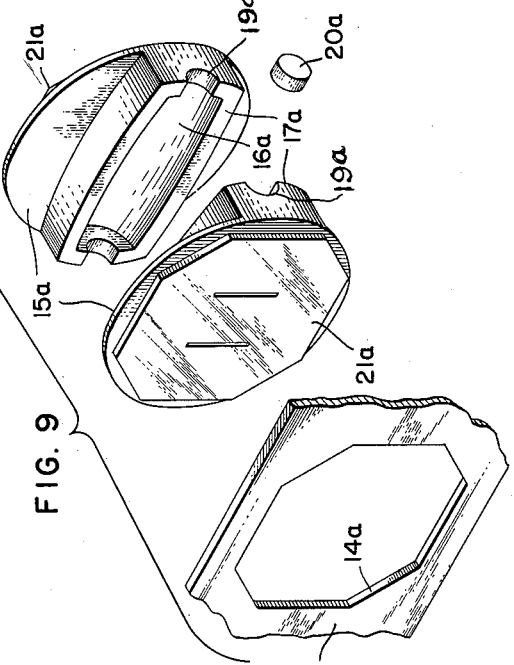
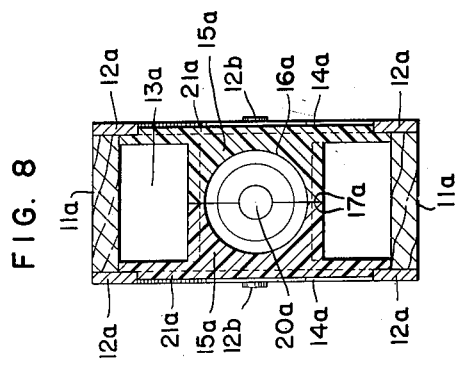
*INVENTOR.*
SINCLAIR T. ROBERTS
BY
Jas. C. Wobensmith
ATTORNEY.

Patented Apr. 14, 1953

2,634,509

UNITED STATES PATENT OFFICE 2,634,509

SPIRIT LEVEL

Sinclair T. Roberts, Philadelphia, Pa.

Application March 26, 1952, Serial No. 278,637

6 Claims. (Cl. 33—211)

1

This invention relates to spirit levels used by carpenters, masons, and other mechanics, for determining whether a particular element of a building or other structure is level, plumb, or in some instances, on a 45° slope.

More specifically considered, this invention relates to spirit levels of the type utilizing a plurality of bubble cells for the aforesaid purpose.

Still more specifically considered, the present invention relates to the provision of a novel form of bubble cell, and the manner of mounting the same in the stock or body of the level.

The principal object of the present invention is to provide a spirit level of a novel construction whereby the parts may be quickly and readily assembled in the making of the same, and in which the necessity for adjustment of the bubble cell and the use of plaster mountings of the cells are eliminated.

A further object of the present invention is to provide a spirit level of the character aforesaid, which will be relatively inexpensive in its construction yet reasonably accurate for its intended purpose.

The nature and characteristic features of the present invention will be more readily understood from the following description, taken in connection with the accompanying drawings forming part hereof, in which:

Figure 1 is a side elevation of a spirit level embodying the main features of the present invention;

Fig. 2 is a longitudinal section thereof taken on the line 2—2 of Fig. 1;

Fig. 3 is a transverse section, enlarged, taken on the line 3—3 of Fig. 1;

Fig. 4 is a fragmentary longitudinal section, taken on the line 4—4 of Fig. 3;

Fig. 5 is a fragmentary view, partly in perspective and partly in section, of certain of the parts of the structure separated from each other;

Fig. 6 is a view similar of Fig. 1, of a modified form of the invention;

Fig. 7 is a longitudinal section taken on the line 7—7 of Fig. 6;

Fig. 8 is a transverse section, enlarged, taken on the line 8—8 of Fig. 7; and

Fig. 9 is a view similar to Fig. 5, but illustrating certain of the parts utilized in the modified form of the invention shown in Figs. 6, 7 and 8, separated from each other.

It should, of course, be understood that the description and drawings herein are illustrative merely, and that various other modifications and changes may be made in the structure disclosed without departing from the spirit of the invention.

2

Referring now more particularly to Figs. 1 to 5 of the drawings, as there shown, the stock or body of the level is made of two similar parts 10, joined to each other in any preferred manner, and provided with means for mounting the bubble cells in a novel manner to be presently described. The stock or body of the level is provided with the usual parallel working surfaces 11. The parts 10 are preferably made of metal, and when lightness is desired, the metal employed may be one of the available alloys of aluminum, magnesium, or the like.

The parts 10, constituting the stock or body of the level, are preferably hollow to provide face walls 12. The face walls 12 may be supported interiorly by blocks 13, made of wood or other suitable material which will effectively serve to prevent deformation of said face walls 12.

The face walls 12 are each provided, at suitable locations, with octagonal apertures 14 for mounting and positioning the bubble cells therein.

The bubble cells are preferably made in two parts 15, each identical with the other, of transparent material such, for example, as one of the moldable acrylic resins, or any other suitable transparent plastic.

The main or body portion of each of the parts 15 of each bubble cell of this form is semi-circular and has a central cavity 16 of such shape that when the two parts are united by having their abutting faces 17 cemented to each other there will be provided an internal barrel shaped cavity for the reception of the bubble liquid 18.

At the end of the central liquid cavity in each of the parts 15 of each bubble cell there is provided an aperture 19 which apertures are adapted to be closed by plugs 20, one of said plugs 20 being initially cemented or otherwise secured in place. The liquid 18 which provides the bubble is introduced through the aperture 19 which is left open for that purpose, after which the plug 20 for that aperture is secured or cemented in place to confine the liquid 18 in the cavity in the bubble cell.

On each side face of each part 15 of the bubble cell there is provided a boss 21 of semi-octagonal shape, the arrangement being such that when the two parts 15 of the bubble cell are united and secured to each other, each side face of the assembled bubble cell is thereby provided with an octagonal boss complemental to and adapted to fit in one of the octagonal apertures 14 in the side face walls 12 of the stock or body of the level.

Each of the parts 15 of the bubble cell may also be provided with a pair of apertures 22 extending parallel to the axis of the liquid cavity in the center of the assembled bubble cell, which are adapted to assist in the register of the parts of the bubble cell when they are being secured or united to each other, and these apertures 22 will also serve to reduce the weight of the bubble cell.

It will be noted that each of the bubble cells when completed is substantially similar to each of the other completed bubble cells, and that the same are of such character that they may be inexpensively manufactured, and also that the same may be readily and easily mounted in the stock or body portion of the level in each of three positions for respectively indicating levels, plumbs and 45° inclines as the bubble cells are mounted in the octagonal apertures 14 in the face walls 12 of the stock or body of the level.

Referring now more particularly to Figs. 6 to 9 of the drawings, there is therein shown a modified form of the level utilizing the principles of the present invention, and also employing a bubble cell of a somewhat different construction and arrangement.

In this form of the invention the body 10a of the level is made of a solid block of material such as wood, either solid or laminated, or it may be made of certain of the plastics which are now available and which may be found to be suitable for this purpose.

In this form of the invention the body 10a is also provided with the working surfaces 11a, and the body is provided with three bores 13a extending therethrough from side to side, and in each of which a bubble cell is located, the side walls for the chambers provided by the bores 13a in the body, are provided on each face by means of a metal plate 12a which may be secured to the body 10a by means of nails 12b, or other suitable fasteners. Each of the metal plates 12a is provided with octagonal shaped apertures 14a registering with the bores 13a in the body.

Also in Figs. 6 to 9, inclusive, there is shown a somewhat different construction of the bubble cells in that the two parts 15a thereof are initially molded to be joined with their abutting faces 17a parallel to the longitudinal axis of the liquid cavity 16a, and in this instance each of the parts 15a of the bubble cell assembly is provided with a complete octagonal boss 21a on its outer face which is complemental to and adapted to fit in one of the octagonal apertures 14a in the metal plates 12a which are secured on the side faces of the body of the level.

The parts 15a of the bubble cell in this instance are each provided, in the walls at each end of the liquid cavity 16a with semi-circular depressions 19a thereby to provide, at each end a circular opening closed by a plug 20a it, of course, being understood that the bubble liquid is introduced into the cavity 16a prior to the cementing of one of the plugs 20a in place.

I claim:

1. A spirit level comprising a body provided with parallel working surfaces, and a plurality of bubble cells mounted therein, said bubble cells each having an internal barrel shaped cavity for the bubble liquid and each having external octagonal portions, the body of the level being provided for each bubble cell with portions having at least two opposed parallel side faces engaged by the octagonal portions of the bubble cell for positioning said bubble cell with its bubble cavity in desired axial relationship to the working faces of the body.

2. A spirit level comprising a body provided with parallel working surfaces, said body having a plurality of straight sided apertures, and bubble cells located in the body, said bubble cells each having an internal cavity for the bubble liquid and each having octagonal portions complemental to the apertures in the body for positioning the bubble cells with their bubble cavities in desired axial relationship to the working faces of the body.

3. A spirit level comprising a body provided with parallel working surfaces, said body having internal chambers and side face walls, said side face walls having a plurality of octagonal apertures, and bubble cells located in the internal chambers of the body portion, said bubble cells each having an internal cavity for the bubble liquid and each having octagonal portions complemental to the octagonal apertures in the side face walls of the body for positioning the bubble cells with their bubble cavities in desired axial relationship to the working faces of the body.

4. A spirit level comprising a body provided with parallel working surfaces, said body having internal chambers and side face walls, said side face walls having a plurality of octagonal apertures, and bubble cells located in the internal chambers of the body, said bubble cells each having an internal barrel shaped cavity for the bubble liquid and each having octagonal bosses on its side faces complemental to the octagonal apertures in the face walls of the body for positioning the bubble cells with their bubble cavities in desired axial relationship to the working faces of the body.

5. A spirit level comprising a body provided with parallel working surfaces, said body being made of two hollow parts thereby to provide internal chambers and side face walls, said side face walls having a plurality of octagonal apertures, and bubble cells located in the internal chambers of the body, said bubble cells each having an internal barrel shaped cavity for the bubble liquid and each having octagonal bosses on its side faces complemental to the octagonal apertures in the face walls of the body for positioning the bubble cells with their bubble cavities in desired axial relationship to the working faces of the body.

6. A spirit level comprising a body provided with parallel working surfaces, said body being made of a block of material having internal chambers formed therein, and plates mounted thereon to provide face walls for said chambers, said face walls having a plurality of octagonal apertures, and bubble cells located in the internal chambers of the body, said bubble cells each having an internal barrel shaped cavity for the bubble liquid and each having octagonal bosses on its side faces complemental to the octagonal apertures in the face walls of the body for positioning the bubble cells with their bubble cavities in desired axial relationship to the working faces of the body.

SINCLAIR T. ROBERTS.

References Cited in the file of this patent

UNITED STATES PATENTS

| Number | Name | Date |
|---|---|---|
| 334,052 | Thayer et al. | Jan. 12, 1886 |
| 2,568,143 | Casper | Sept. 18, 1951 |